(12) United States Patent
Karasawa (10) Patent No.: US 7,045,796 B2
(45) Date of Patent: May 16, 2006

(54) IMAGING DEVICE WITH REFLECTING LIGHT GUIDE

(75) Inventor: Hiroyuki Karasawa, Fujisawa (JP)

(73) Assignee: Fuki Photo Film Co., Ltd., Kanagawa-ken (JP)

( * ) Notice: Subject to any disclaimer, the term of this patent is extended or adjusted under 35 U.S.C. 154(b) by 292 days.

(21) Appl. No.: 10/244,509

(22) Filed: Sep. 17, 2002

(65) Prior Publication Data

US 2003/0057362 A1 Mar. 27, 2003

(30) Foreign Application Priority Data

Sep. 27, 2001 (JP) .............................. 2001-296538

(51) Int. Cl.
*G02B 26/08* (2006.01)

(52) U.S. Cl. ..................................................... 250/484

(58) Field of Classification Search ................ 250/581, 250/208.1, 216, 586, 584, 591, 227.11, 363.02
See application file for complete search history.

(56) References Cited

U.S. PATENT DOCUMENTS 6,376,856 B1 * 4/2002 Katagiri ....................... 250/584
6,590,194 B1 * 7/2003 Sardana ................... 250/208.1

* cited by examiner

*Primary Examiner*—Thanh X. Luu
*Assistant Examiner*—Tony Ko
(74) *Attorney, Agent, or Firm*—Sughrue Mion, PLLC (57) ABSTRACT

A CCD line sensor has CCDs and fiber optic light guide members mounted on the CCDs. Each of the fiber optic light guide members comprises a plurality of fiber optic plates arrayed in a main direction and longer than the width of photodiodes in an auxiliary direction. The fiber optic light guide members serve to guide photo-stimulated light R spread in the auxiliary direction and applied thereto into the photodiodes.

17 Claims, 9 Drawing Sheets

IMAGING DEVICE WITH REFLECTING LIGHT GUIDE

BACKGROUND OF THE INVENTION

1. Field of the Invention

The present invention relates to an imaging device for photoelectrically reading visual information such as character information, image information, or the like.

2. Description of the Related Art

There are known systems for either reproducing radiation image information of a subject such as a human body on a photographic photosensitive medium or the like, or outputting the radiation image information as a visible image on a CRT or the like, using a stimulable phosphor which, when exposed to an applied radiation (X-rays, α-rays, β-rays, γ-rays, electron beams, ultraviolet radiation, or the like), stores a part of the energy of the radiation, and, when subsequently exposed to applied stimulating rays such as visible light, emits photo-stimulated light in proportion to the stored energy of the radiation.

Specifically, radiation image information of a subject such as a human body is temporarily recorded on a stimulable phosphor sheet which has a stimulable phosphor layer. When a stimulating light beam such as a laser beam or the like is applied to the stimulable phosphor sheet, the stimulable phosphor sheet emits photo-stimulated light that is commensurate with the recorded radiation image information. The photo-stimulated light is photoelectrically read and converted into an image signal, which is processed to output (reproduce) a visible image based on the radiation image information on a recording medium such as a photographic photosensitive medium or a display unit such as a CRT. Various apparatus which record and output such radiation image information are used in the art.

The above apparatus incorporate a reading assembly which comprises a stimulating system for applying a stimulating light beam to a stimulable phosphor sheet to scan the stimulable phosphor sheet two-dimensionally, and a light collecting system for photoelectrically reading photo-stimulated light emitted from the stimulable phosphor sheet in response to the applied stimulating light beam. The light collecting system generally comprises photoelectric transducers such as CCDs (Charge-Coupled Devices), for example.

The photo-stimulated light emitted from the stimulable phosphor sheet spreads to a size which is more than twice the diameter of the stimulating light beam. The CCDs have a pixel width (ranging from several μm to several tens μm) which is too small to detect the photo-stimulated light sufficiently. When the stored radiation image information is read from the stimulable phosphor sheet, therefore, the reading efficiency tends to be low due to the small pixel width of the CCD, and the low reading efficiency is liable to cause a reduction in the quality of an image which will be produced from the read radiation image information. This is because the effective amount of light detected by the CCD governs the signal-to-noise ratio of the resulting image, and the stimulating light beam spreads in an auxiliary direction which is substantially perpendicular to the array of pixels of the CCD, greatly reducing its amount of light falling on the CCD.

Figure 9:
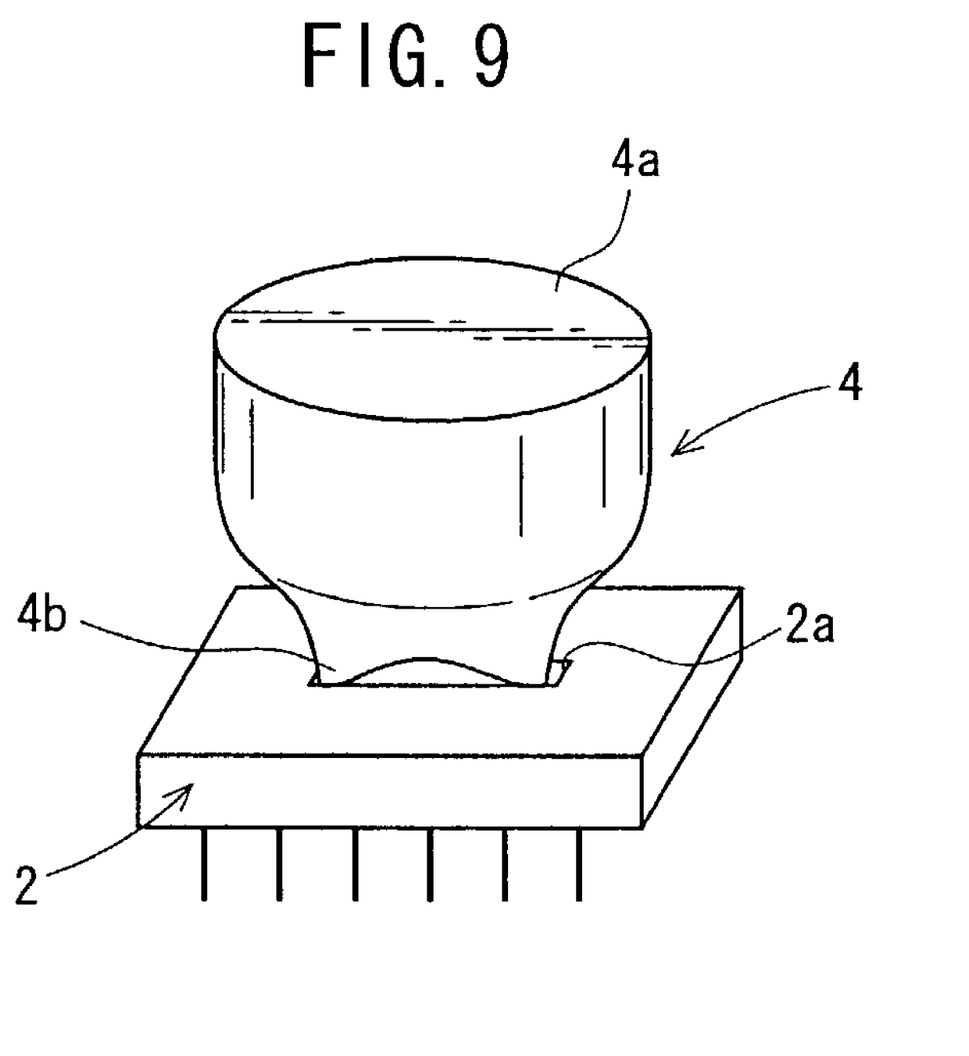
FIG. 9 is a perspective view of a conventional conical multiple fiber assembly combined with a CCD.

It has been proposed, as shown in FIG. 9 of the accompanying drawings, to employ a conical multiple fiber assembly 4 disposed on an entrance surface 2a of a CCD 2 and having a larger-diameter end 4a and a smaller-diameter end 4b facing the entrance surface 2a. Light which has entered the larger-diameter end 4a of the conical multiple fiber assembly 4 leaves from the smaller-diameter end 4b thereof, and is focused on the entrance surface 2a.

The conical multiple fiber assembly 4 has a slanted circumferential surface extending from the larger-diameter end 4a toward the smaller-diameter end 4b. Therefore, light travelling in the conical multiple fiber assembly 4 and applied at a small angle to the slanted circumferential surface is not totally reflected within the conical multiple fiber assembly 4, but tends to leak out of the conical multiple fiber assembly 4. Accordingly, the light propagating efficiency of the conical multiple fiber assembly 4 is relatively low with respect to spreading light. The conical multiple fiber assembly 4 includes absorbent glass interposed between individual optical fibers, lowering the ratio of the optical fibers packed in the conical multiple fiber assembly 4. This structure makes it difficult or impossible to increase the light propagating efficiency of the conical multiple fiber assembly 4.

SUMMARY OF THE INVENTION

It is a major object of the present invention to provide an imaging device which is of a relatively simple structure for performing a high-quality imaging process with an effectively increased efficiency.

According to the present invention, an imaging device for photoelectrically reading visual information has a photoelectric transducer and a fiber optic light guide member arrayed in a main direction in which pixels of the photoelectric transducer are arrayed and having a length greater than the width of the pixels in an auxiliary direction which is substantially perpendicular to the main direction. With this arrangement, the width of the pixels in the auxiliary direction of the photoelectric transducer is virtually increased. Therefore, the imaging device has a relatively simple structure and is capable of effectively increasing the light collecting efficiency, i.e., the efficiency with which the photo-stimulated light is applied to the photoelectric transducer.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
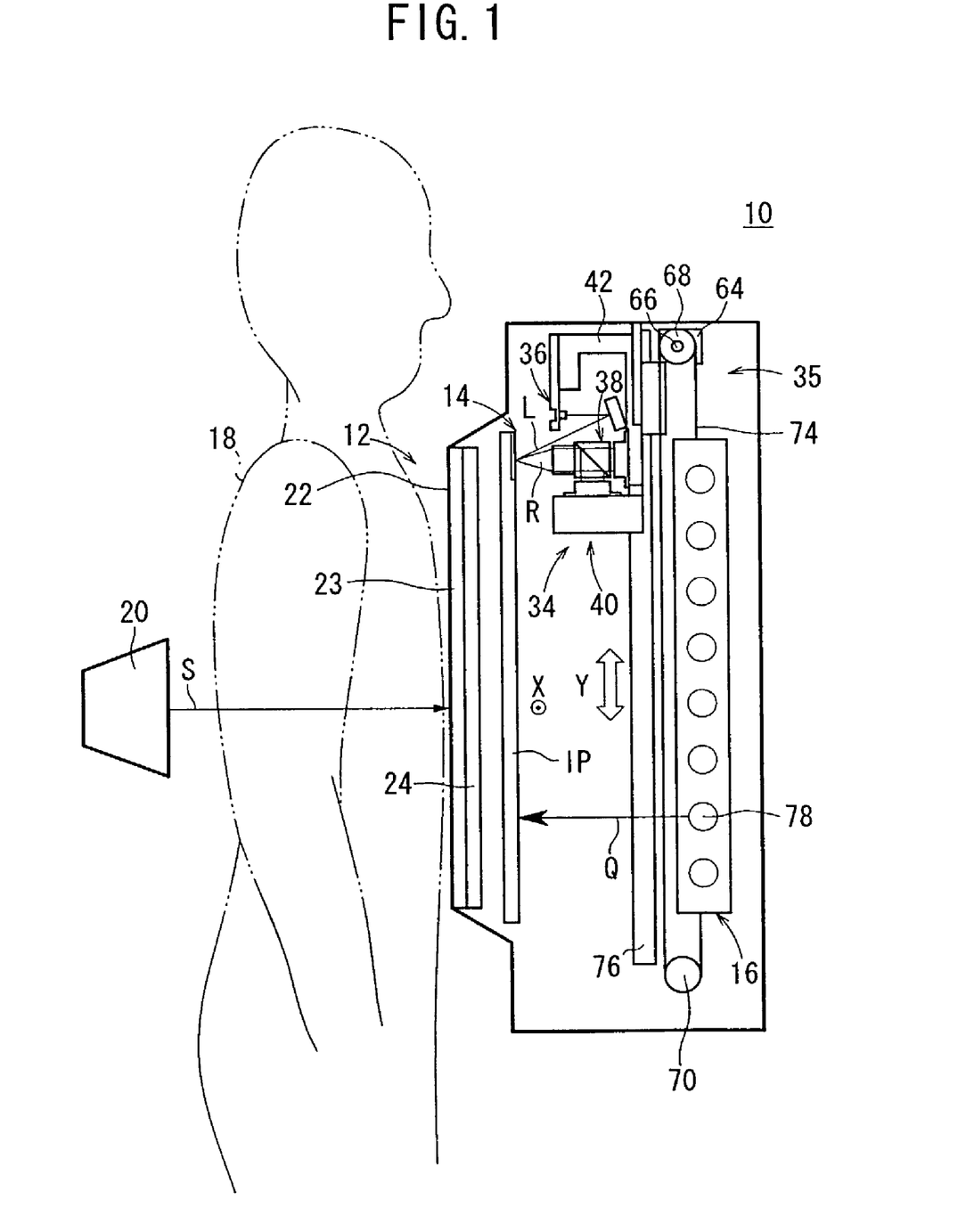
FIG. 1 is a schematic vertical cross-sectional view of a radiation image information recording and reading apparatus which incorporates an imaging device according to a first embodiment of the present invention.

FIG. 1 shows in schematic vertical cross section a radiation image information recording and reading apparatus 10 which incorporates an imaging device according to a first embodiment of the present invention.

As shown in FIG. 1, the radiation image information recording and reading apparatus 10 comprises a radiation recording unit 12 for temporarily recording radiation image information of a subject 18 such as a human body on a stimulable phosphor sheet IP, a reading assembly (imaging device) 14 for applying a stimulating light beam L such as a laser beam to the stimulable phosphor sheet IP and photoelectrically reading photo-stimulated light R emitted from the stimulable phosphor sheet IP depending on the intensity of the radiation image information recorded on the stimulable phosphor sheet IP, and an erasing light source 16 for discharging radiation energy remaining on the stimulable phosphor sheet IP.

The radiation recording unit 12 has a radiation source 20 for generating a radiation S and a radiation-transmissive exposure table 22 for holding the subject 18 in a given position. A photo-timer 23 and a grid 24 for removing scattered light rays are disposed behind the exposure table 22. The stimulable phosphor sheet IP is held in a predetermined exposure position behind the grid 24.

The reading assembly 14 comprises a scanner unit 34 for photoelectrically reading radiation image information carried by the stimulable phosphor sheet IP, and an auxiliary scanning unit 35 for moving the scanner unit 34 in the vertical direction (the direction Y).

Figure 2:
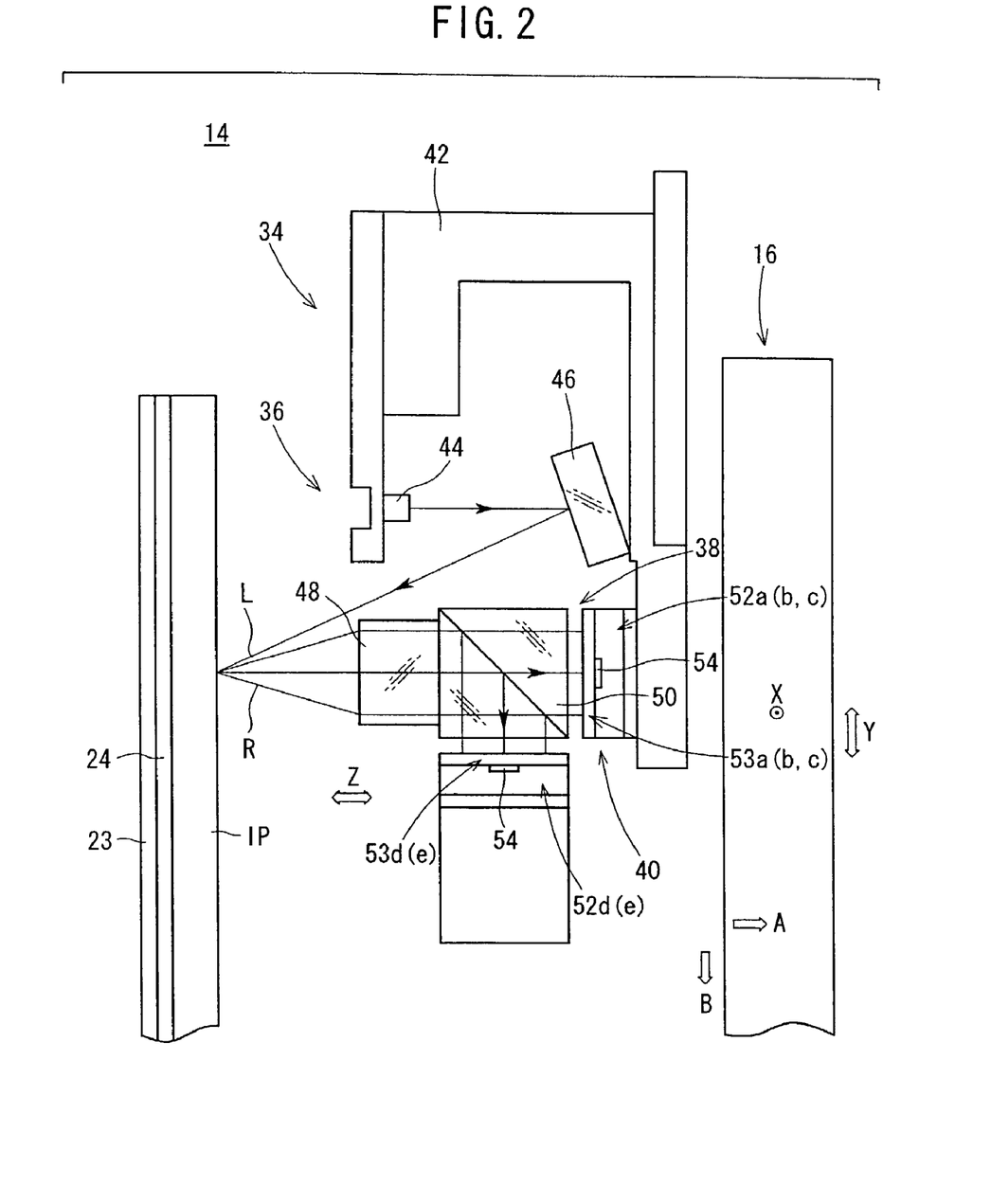
FIG. 2 is an enlarged view of a reading assembly of the imaging device shown in FIG. 1.

As shown in FIG. 2, the scanner unit 34 has a stimulating light beam system 36, a condensing lens array 38, and a CCD line sensor (photoelectric transducer) 40. The stimulating light beam system 36, the condensing lens array 38, and the CCD line sensor 40 are successively arranged in a main direction and mounted on a scanner head 42.

The stimulating light beam system 36 has a plurality of laser diodes 44 arrayed in the main direction (the direction X). The laser diodes 44 have respective stimulating light beam outlet ends facing away from the stimulable phosphor sheet IP. Stimulating light beams emitted as scattering light beams from the laser diodes 44 are reflected by a cylindrical mirror 46, and are applied as a linear stimulating light beam L extending in the main scanning direction to the stimulable phosphor sheet IP.

The condensing lens array 38 comprises a cylindrical lens 48 mounted on the scanner head 42 and extending in the main direction for condensing photo-stimulated light R emitted from the stimulable phosphor sheet IP, and a prism 50 disposed closely to the cylindrical lens 48 for dividing the photo-stimulated light R into a light beam in the direction indicated by the arrow A (horizontal direction) and a light beam in the direction indicated by the arrow B (vertically downward direction).

Figure 3:
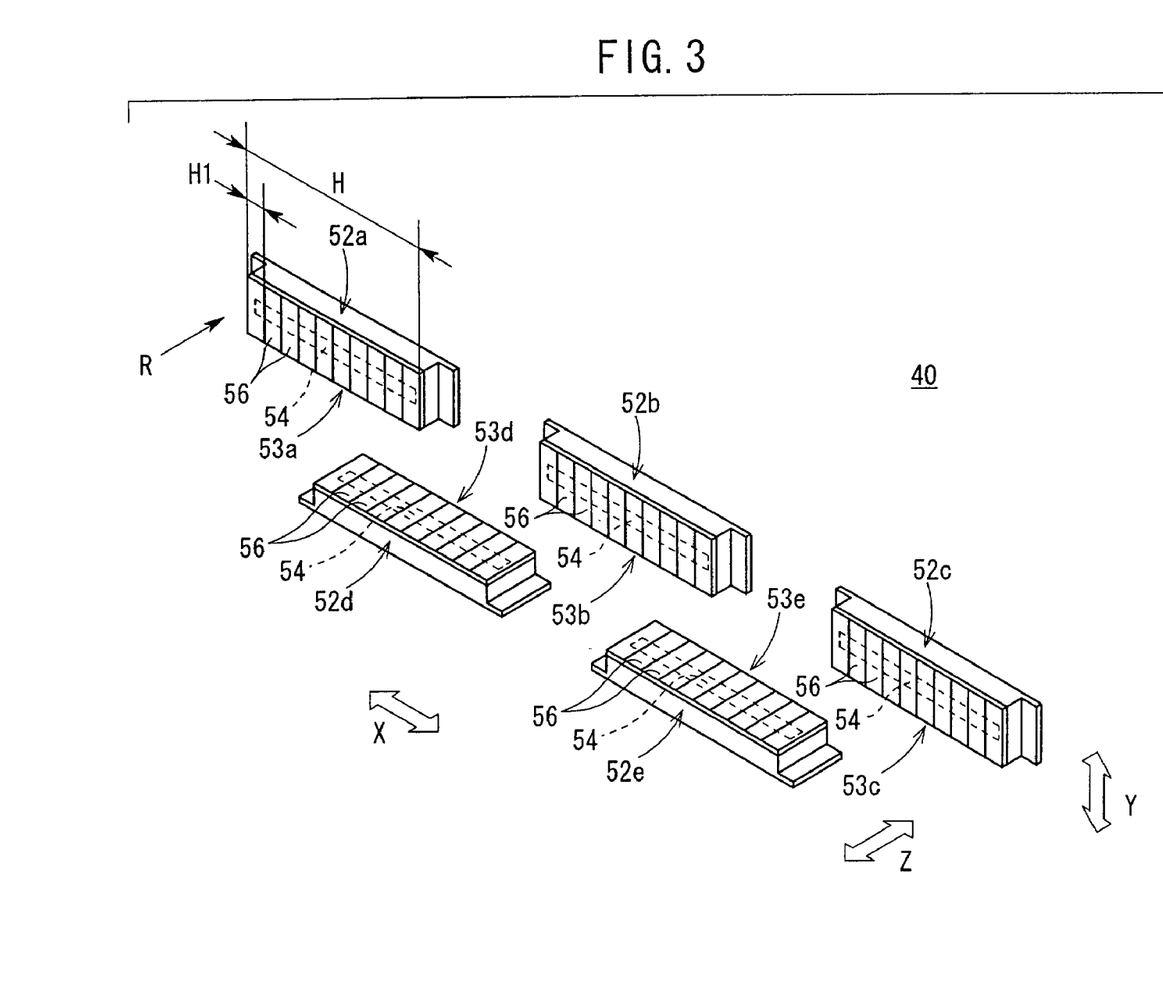
FIG. 3 is a perspective view of a CCD line sensor of the reading assembly shown in FIG. 2.

As shown in FIGS. 2 and 3, the CCD line sensor 40 comprises a plurality of, e.g., five, CCDs 52a through 52e.

The three CCDs 52a, 52b, 52c are disposed alongside of the prism 50 at spaced intervals, and the two CCDs 52d, 52e are disposed below the prism 50 between the three CCDs 52a, 52b, 52c. The CCD 52d is positioned so as to be partly overlapping the CCDs 52a, 52b, and the CCD 52e is positioned so as to be partly overlapping the CCDs 52b, 52c.

Fiber optic light guide members 53a through 53e are mounted on the respective CCDs 52a through 52e. Each of the fiber optic light guide members 53a through 53e has a plurality of fiber optic plates 56 arrayed in the main direction (direction X), in which pixels are arrayed, on photodiodes 54 of one of the CCDs 52a through 52e. The fiber optic plates 56 are longer than the width of the pixels in auxiliary directions (the directions indicated by the arrows Y, Z) which are substantially perpendicular to the main direction.

Each of the fiber optic plates 56 has a width H1 smaller than the pitch or width H of a readout pixel. In the first embodiment, the width H1 is selected to be equal to H/10. The CCD 52a comprises a plurality of pixels (different from the readout pixel) corresponding to the photodiodes 54 and smaller than the pitch or width H of the readout pixel. For example, if the pitch or width H of the readout pixel is 100 μm, then each of the pixels of the CCD 52a has a width ranging from several μm to several tens μm, and the width h1 of the fiber optic plates 56 is of about 10 μm.

Figure 4:
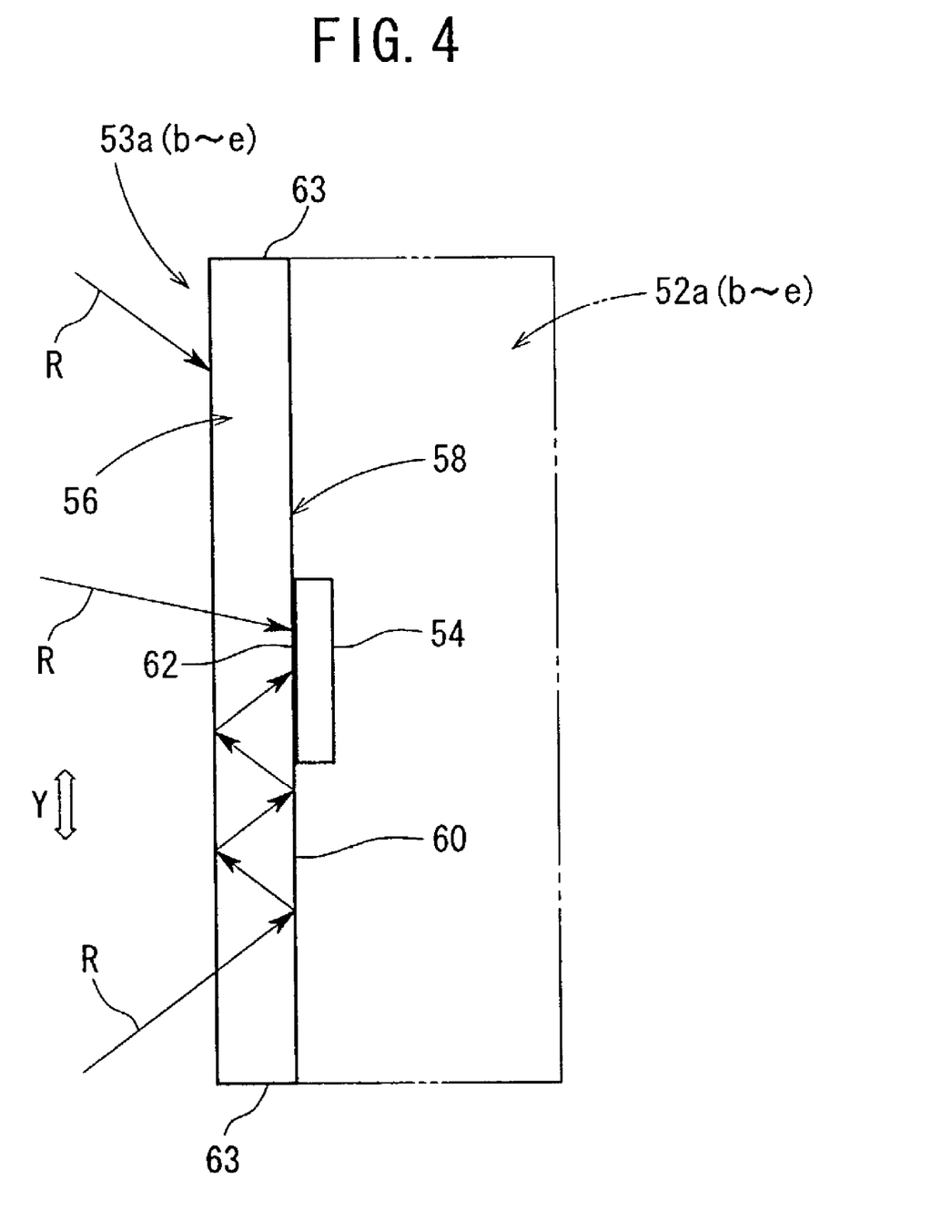
FIG. 4 is a view showing a CCD and a fiber optic light guide member of the CCD line sensor.

The fiber optic plates 56 are of a square cross section and have respective joint faces 58 optically connected to the photodiodes 54. As shown in FIG. 4, each of the joint faces 58 has a scattering and reflecting surface 60 for scattering and reflecting light in an area other than a central non-scattering area connected to the photodiodes 54. The photodiodes 54 are optically connected to the central non-scattering area of the joint face 58 by a transparent adhesive 62. Each of the fiber optic plates 56 has opposite ends having respective reflecting surfaces 63 lying transversely across the joint face 58.

The CCDs 52b through 52e and the fiber optic light guide members 53b through 53e are constructed identically to the CCD 52a and the fiber optic light guide member 53a. Those parts of the CCDs 52b through 52e and the fiber optic light guide members 53b through 53e which are identical to those of the CCD 52a and the fiber optic light guide member 53a are denoted by identical reference characters, and will not be described in detail below.

As shown in FIG. 1, the auxiliary scanning system 35 has a rotary actuator 64 disposed at one end (upper end) thereof in the direction Y. Two drive pulleys 68 are fixed to the opposite ends of a rotatable shaft 66 extending from the rotary actuator 64 in the direction X. Driven pulleys 70 are positioned at a given distance from the drive pulleys 68 in the direction Y. Belts 74 are trained around the drive pulleys 68 and the driven pulleys 70. The scanner head 42 is fixed to the belts 74 and supported on a pair of guide rails 76 extending in the direction Y.

The erasing light source 16 is disposed in confronting relation to the stimulable phosphor sheet IP across the reading assembly 14. The erasing light source 16 serves to apply erasing light Q to the stimulable phosphor sheet IP for thereby discharging radiation energy remaining in the stimulable phosphor sheet IP. The erasing light source 16 has a plurality of fluorescent lamps 78 arrayed in the longitudinal direction (the direction Y) of the stimulable phosphor sheet IP and each having a length equal to or greater than the width (the direction X) of the stimulable phosphor sheet IP. The fluorescent lamps 78 apply the erasing light Q to the entire area of the stimulable phosphor sheet IP.

Operation of the radiation image information recording and reading apparatus 10 thus constructed will be described below.

When a patient moves toward the radiation recording unit 12 in order to have radiation image information thereof recorded, the doctor or operator vertically moves the exposure table 22 to establish a recording position. Then, the patient places a body part as the subject 18 on the exposure table 22, and the doctor or operator energizes the radiation source 20. The radiation source 20 outputs a radiation which passes through the subject 18 and reaches the stimulable phosphor sheet IP, thus recording radiation image information of the subject 18 in the stimulable phosphor sheet IP.

After the radiation image information of the subject 18 is recorded in the stimulable phosphor sheet IP, the stimulating light beam system 36 of the reading assembly 14 is energized, and the rotary actuator 64 of the auxiliary scanning system 35 is also energized. In the stimulating light beam system 36, as shown in FIG. 2, the laser diodes 44 arrayed in the main direction (the direction X) of the stimulable phosphor sheet IP are energized to emit respective stimulating light beams, which are then reflected by the cylindrical mirror 46 and applied as a linear stimulating light beam L to the stimulable phosphor sheet IP in the direction X.

When the drive pulleys 68 are rotated by the rotary actuator 64 through its rotatable shaft 66, the belts 74 trained around the drive pulleys 68 and the driven pulleys 70 are moved in the circulatory path, moving the scanner head 42 fixed to the belts 74 in the direction Y. The stimulable phosphor sheet IP which is storing the radiation image information is two-dimensionally scanned by the stimulating light beam L, emitting photo-stimulated light R depending on the stored radiation image information.

The emitted photo-stimulated light R travels through the condensing lens array 38 and is applied to the CCD line sensor 40. The photo-stimulated light R applied to the CCD line sensor 40 falls on the CCDs 52a through 52e, which convert the photo-stimulated light R into electric signals, thus photoelectrically reading the radiation image information stored in the stimulable phosphor sheet IP.

According to the first embodiment, the fiber optic light guide members 53a through 53e are mounted on the respective CCDs 52a through 52e, and the fiber optic plates 56 comprising fiber optic light guide members 53a through 53e are arrayed in the main direction on the photodiodes of the CCDs 52a through 52e. The fiber optic plates 56 are longer than the width of the photodiodes 54 in auxiliary directions, and the photodiodes 54 are optically connected to the substantially central longitudinal areas of the fiber optic plates 56. More particularly, the length (longitudinal direction) of the fiber optic plates 56 on CCDs 52a, 52b, and 52c is in the Y direction, perpendicular to the main direction in which plates are arrayed. Similarly, the length of the fiber optic plates 56 on CCDs 52d and 52e is in the Z direction. Directions Y and Z are both auxiliary directions and are perpendicular to the main direction in which fiber optic plates are arrayed, the X direction.

As shown in FIG. 4, the photo-stimulated light R applied to the fiber optic light guide member 53a of the CCD 52a, for example, is spread in the auxiliary direction (direction Y), and falls on the CCD 52a in a wide area in the direction Y including the photodiodes 54.

The photo-stimulated light R applied to those areas of the fiber optic plates 56 which correspond to the photodiodes 54 passes through the fiber optic plates 56 directly into the photodiodes 54 that are optically connected to the fiber optic plates 56. Therefore, the efficiency with which the photo-stimulated light R is applied to the photodiodes 54 is not lowered.

The photo-stimulated light R applied to those areas of the fiber optic plates 56 which do not correspond to the photodiodes 54 is reflected by the scattering surfaces 60 of the joint faces 58. The photo-stimulated light R reflected by the scattering surfaces 60 is totally reflected in the fiber optic plates 56 and guided therethrough to the photodiodes 54. Since the reflecting surfaces 63 are disposed on the opposite ends of the fiber optic plates 56, the photo-stimulated light R scattered within the fiber optic plates 56 does not leak out of the fiber optic plates 56, but is caused to fall on the photodiodes 54.

In the first embodiment, therefore, the photo-stimulated light R which spreads in the auxiliary direction and is applied to the CCD 52a is efficiently and reliably guided into the photodiodes 54, for thereby effectively increasing the quality of an image produced based on the radiation image information read from the stimulable phosphor sheet IP.

The resolution in the main direction of the CCD 52a depends on the width H1 of the fiber optic plates 56. Since the width H1 is smaller than the readout pixel pitch H, the resolution in the main direction of the CCD 52a is not adversely affected, and the efficiency with which the photo-stimulated light R is applied to the photodiodes 54 can be increased. Inasmuch as the CCDs 52b through 52e and the fiber optic light guide members 53b through 53e are identical to the CCD 52a and the fiber optic light guide member 53a, the CCDs 52b through 52e and the fiber optic light guide members 53b through 53e offer the same advantages as those described above with respect to the CCD 52a and the fiber optic light guide member 53a.

After the radiation image information is read from the stimulable phosphor sheet IP, the fluorescent lamps 78 of the erasing light source 16 apply erasing light Q to the stimulable phosphor sheet IP. The stimulable phosphor sheet IP discharges radiation energy remaining therein, and will be used in a next exposure cycle.

Figure 5:
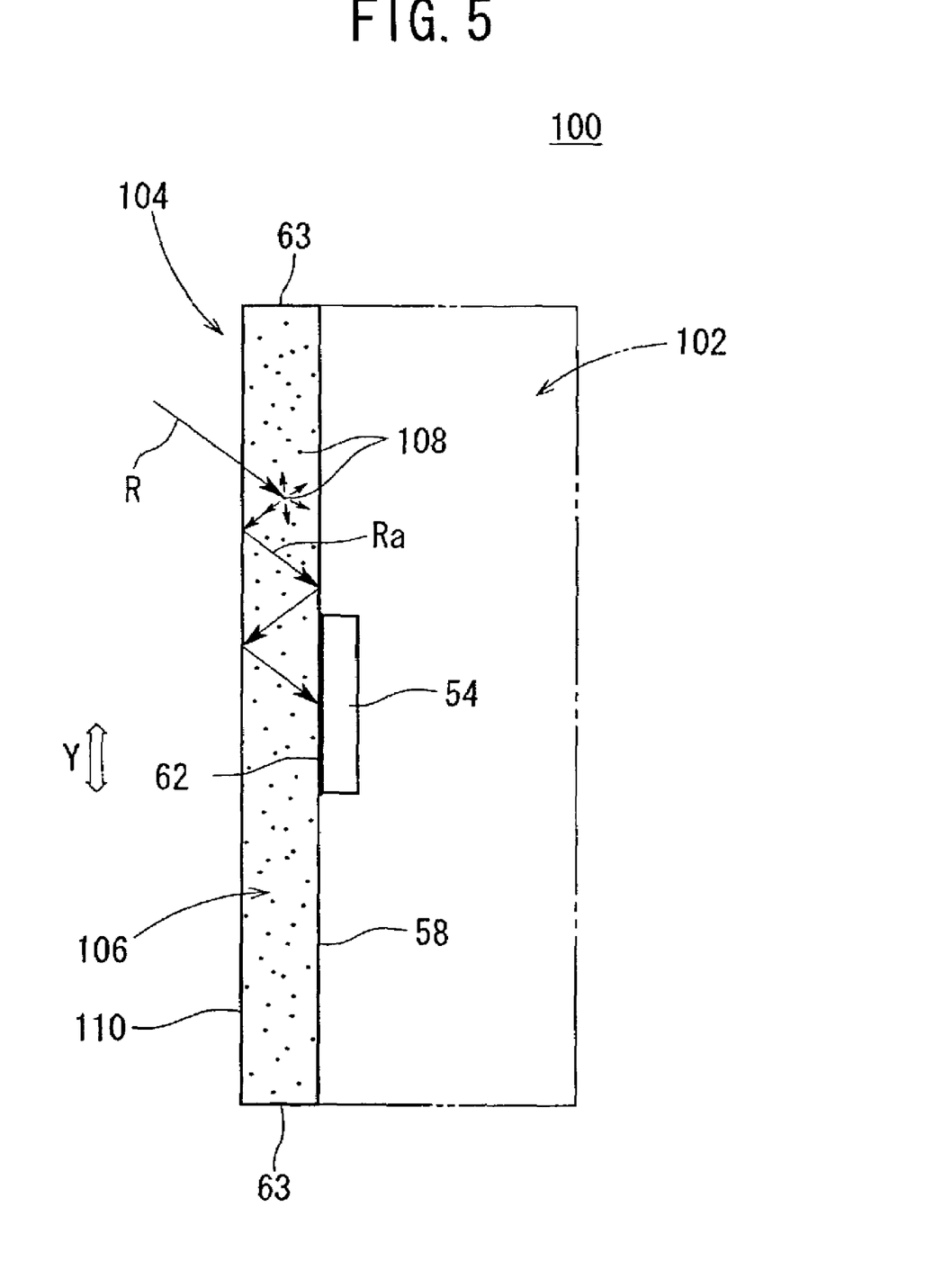
FIG. 5 is a view of a reading assembly of an imaging device according to a second embodiment of the present invention.

FIG. 5 shows a reading assembly 100 of an imaging device according to a second embodiment of the present invention. Those parts of the reading assembly 100 which are identical to those of the reading assembly 14 according to the first embodiment are denoted by identical reference characters, and will not be described in detail below. Similarly, those parts of reading assemblies according to other embodiments which are identical to those of the reading assembly 14 according to the first embodiment are denoted by identical reference characters, and will not be described in detail below.

As shown in FIG. 5, a CCD 102 comprises an array of photodiodes 54 and a fiber optic light guide member 104 optically connected to the photodiodes 54 by a transparent adhesive 62. The fiber optic light guide member 104 comprises a plurality of fiber optic plates 106 longer than the width of the photodiodes 54. As shown FIG. 5, the length of the fiber optic plates 106 is in the auxiliary (Y) direction. Although not shown, the fiber optic plates 106 are arrayed in the main (X) direction.

Each of the fiber optic plates 106 contains a light-emitting body 108 as a wavelength converting means for converting the wavelength of the photo-stimulated light R applied thereto. The light-emitting body 108 comprises an organic phosphor such as of a coumarin derivative, a thioxanthone derivative, a perylene derivative, or a boron complex, and has a function to convert the wavelength of the photo-stimulated light R applied thereto into a longer wavelength.

For example, if the photo-stimulated light R applied to the light-emitting body 108 has a wavelength of 400 nm, then the photo-stimulated light R is converted into light Ra having a wavelength of 500 nm by the light-emitting body 108.

Each of the fiber optic plates 106 has an entrance surface coated with a layer 110, e.g., a dichroic layer, for passing the applied photo-stimulated light R therethrough and reflecting the light Ra converted from the photo-stimulated light R.

When the photo-stimulated light R applied to the CCD 102 falls on the fiber optic plates 106, it is converted into the light Ra of a longer wavelength by the light-emitting body 108 contained in the fiber optic plates 106. The right Ra spreads isotropically and is totally reflected in the fiber optic plates 106, and then is applied to the photodiodes 54. The dichroic layer 110 on the entrance surface of the fiber optic plates 106 introduces the photo-stimulated light R into the fiber optic plates 106, but prevents the longer-wavelength right Ra from going out of the fiber optic plates 106.

Therefore, the photo-stimulated light R which spreads in the auxiliary direction (direction Y) is reliably guided into the photodiodes 54 by the fiber optic light guide member 104. The reading assembly 100 shown in FIG. 5 thus offers the same advantages as the reading assembly 14 according to the first embodiment in that the efficiency with which the light Ra is applied to the photodiodes 54 is increased and the quality of an image which will be produced from the read radiation image information is prevented from being lowered.

In the second embodiment, the light-emitting body 108 converts the photo-stimulated light R into the longer-wavelength light Ra and the longer-wavelength light Ra spreads isotropically. Consequently, the joint faces 58 of the fiber optic plates 106 do not need to have a surface for scattering and reflecting light. As a result, the reading assembly 100 is economical.

Figure 6:
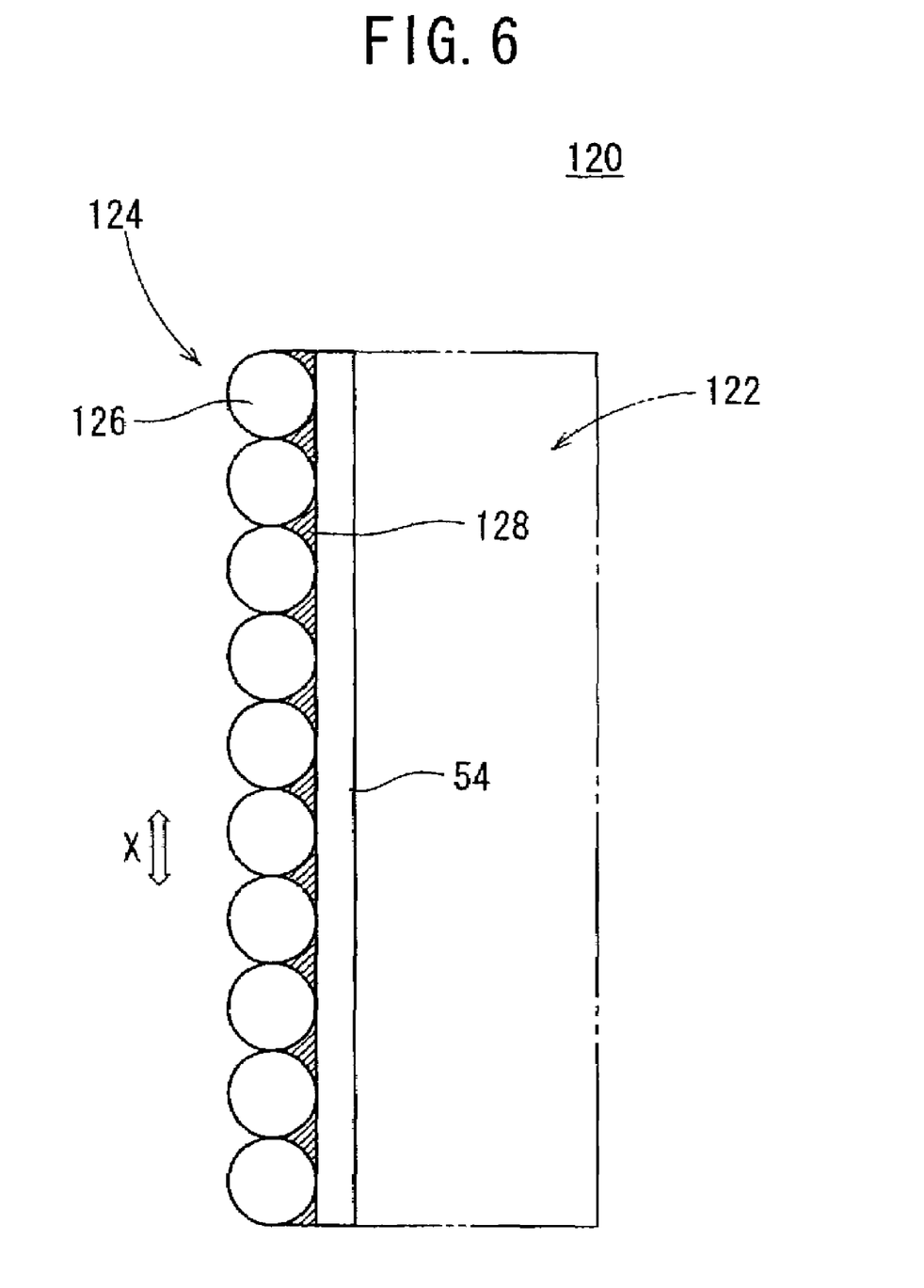
FIG. 6 is a view of a reading assembly of an imaging device according to a third embodiment of the present invention.

FIG. 6 shows a reading assembly 120 of an imaging device according to a third embodiment of the present invention.

According to the third embodiment, a fiber optic light guide member 124 is joined to the entrance surface of a CCD 122. The fiber optic light guide member 124 comprises a plurality of cylindrical fiber optic plates 126 arrayed in the main direction (direction X) and optically connected to the photodiodes 54 by a transparent adhesive 128.

Figure 7:
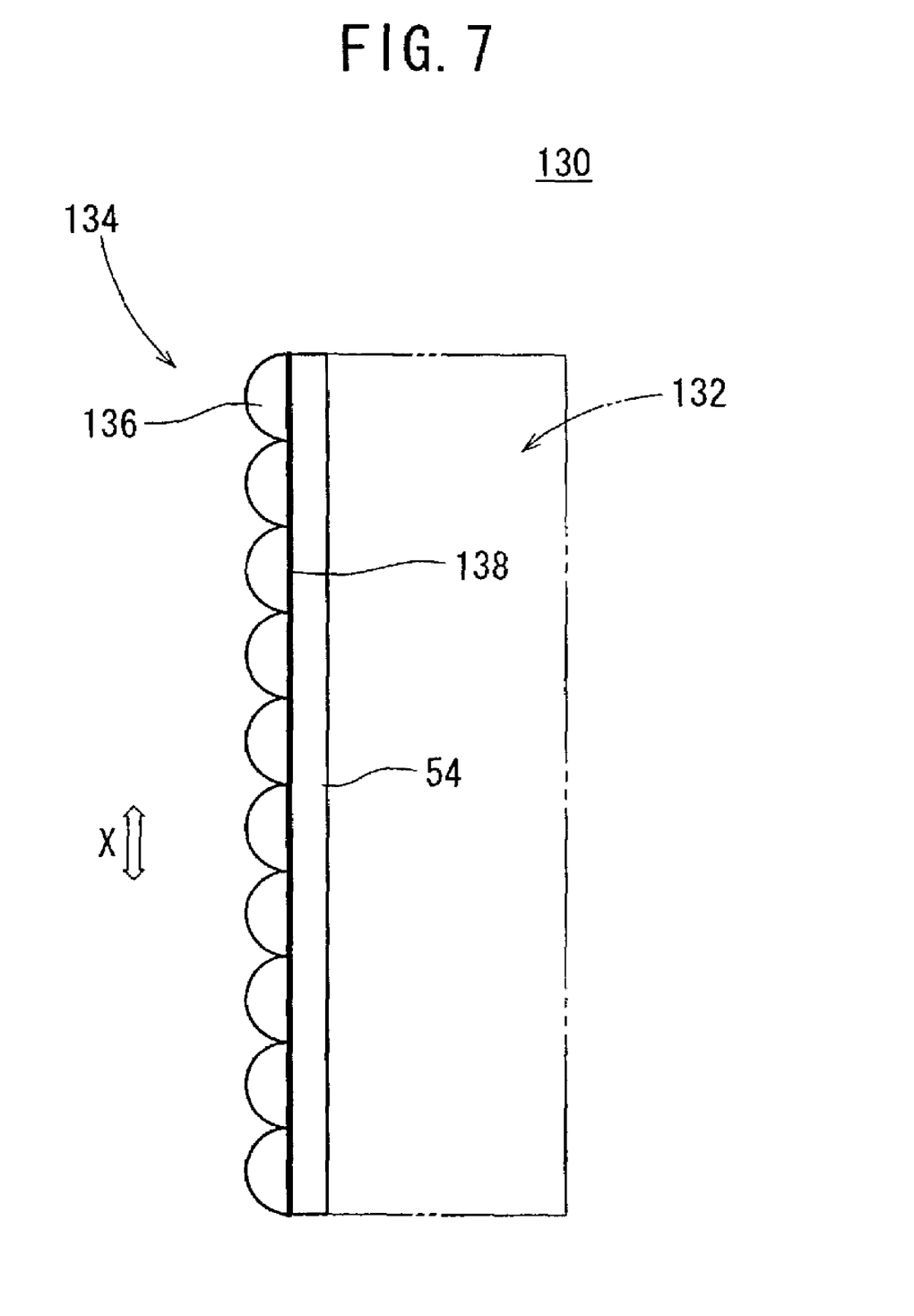
FIG. 7 is a view of a reading assembly of an imaging device according to a fourth embodiment of the present invention.

FIG. 7 shows a reading assembly 130 of an imaging device according to a fourth embodiment of the present invention.

According to the fourth embodiment, a fiber optic light guide member 134 is joined to the entrance surface of a CCD 132. The fiber optic light guide member 134 comprises a plurality of semicylindrical fiber optic plates 136 arrayed in the main direction (direction X) and having flat surfaces optically connected to the photodiodes 54 by a transparent adhesive 138.

Figure 8:
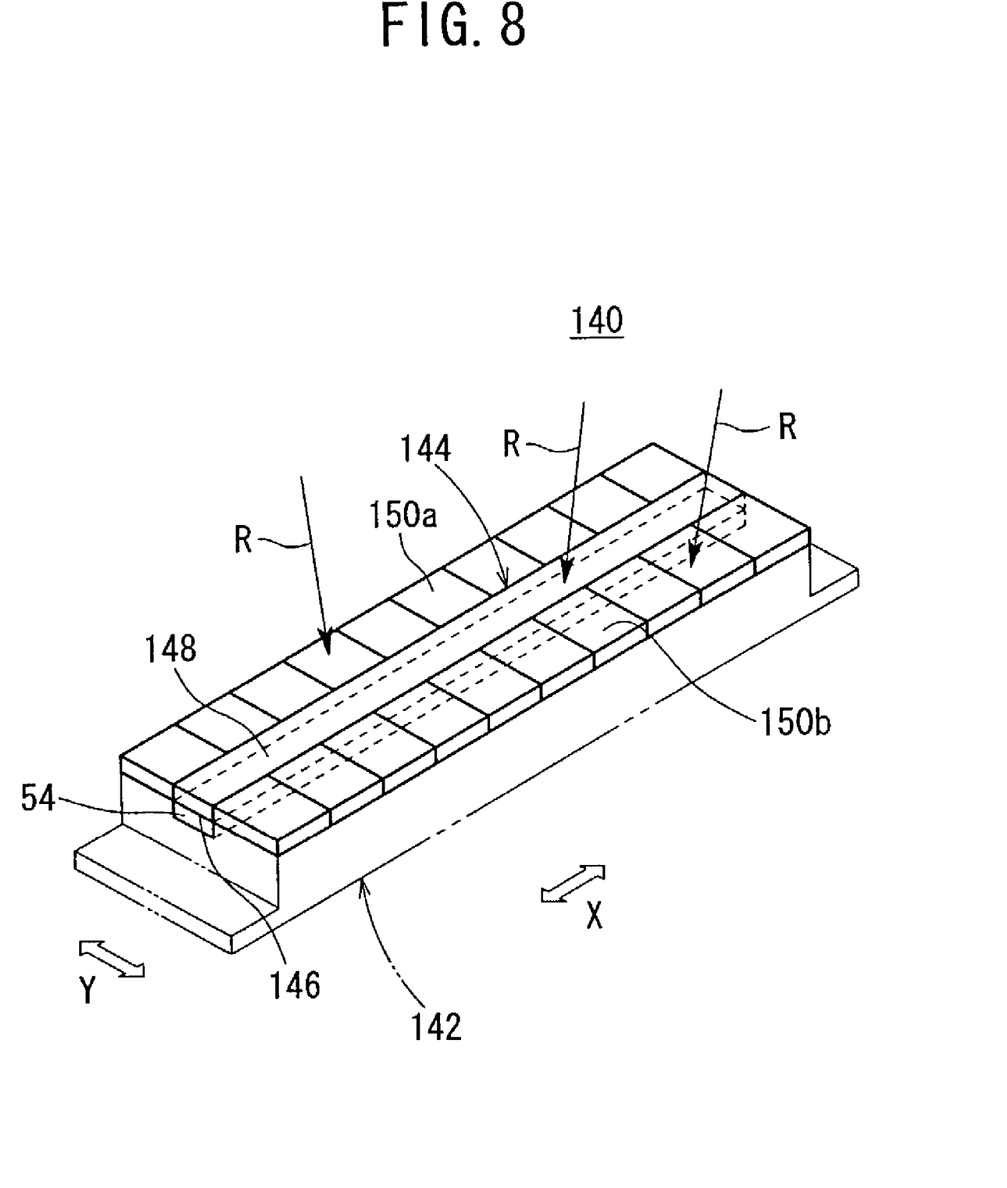
FIG. 8 is a perspective view of a reading assembly of an imaging device according to a fifth embodiment of the present invention.

FIG. 8 shows a reading assembly 140 of an imaging device according to a fifth embodiment of the present invention.

According to the fifth embodiment, a fiber optic light guide member 144 is joined to the entrance surface of a CCD 142. The fiber optic light guide member 144 comprises a flat strip 148 optically connected to the photodiodes 54 by a transparent adhesive 146 and two arrays of fiber optic plates 150a, 150b disposed one on each side of the flat strip 148 and extending in the direction X, the fiber optic plates 150a, 150b projecting from the flat strip 148 by a given length in the direction Y.

The photo-stimulated light R spreading in the direction Y and applied to the reading assembly 140 is repeatedly totally reflected in the fiber optic plates 150a, 150b and guided into the flat strip 148, from which the photo-stimulated light R is applied to the photodiodes 54 that are optically connected to the flat strip 148. Since no fiber structure is connected directly to the photodiodes 54, the reading assembly 140 is effective to increase the efficiency with which the photo-stimulated light R is applied to the photodiodes 54.

In the first embodiment, the imaging device has been described as being incorporated in the radiation image information recording and reading apparatus 10. However, the principles of the present invention are also applicable to an apparatus for reading, from a stimulable phosphor sheet IP loaded therein, radiation image information which has been recorded on the stimulable phosphor sheet by a separate radiation image information recording apparatus, a scanner for reading an image carried on an original, a color copying machine, a reading apparatus using ultraviolet LEDs, etc.

The imaging device according to the present invention has fiber optic light guide members arrayed in the main direction in which the pixels of a photoelectric transducer are arrayed and having a length greater than the width of the pixels in the auxiliary direction which is substantially perpendicular to the main direction. Therefore, the width of the pixels in the auxiliary direction of the photoelectric transducer is virtually increased. Therefore, the imaging device has a relatively simple structure and is capable of performing a high-quality imaging process with an effectively increased efficiency.

Although certain preferred embodiments of the present invention have been shown and described in detail, it should be understood that various changes and modifications may be made therein without departing from the scope of the appended claims.

What is claimed is:

1. An imaging device for photoelectrically reading visual information, comprising:
    a photoelectric transducer; and
    a fiber optic light guide member mounted on said photoelectric transducer, comprising a plurality of fiber optic elements arrayed in a main direction in which pixels of said photoelectric transducer are also arrayed,
    and having a length greater than the width of said pixels, and
    said length being in an auxiliary direction which is substantially perpendicular to said main direction,
    wherein said fiber optic light guide member has an entrance surface on one side to which light is applied and an opposite parallel surface on the other side from which the light exits, and wherein said entrance surface and said exit surface are parallel to the auxiliary direction of said length of said fiber optic light guide member.

2. An imaging device according to claim 1, wherein said fiber optic light guide member has a joint face, said joint face having a scattering and reflecting surface for scattering and reflecting light and a non-scattering and non-reflecting surface, said photoelectric transducer being optically connected to said non-scattering and non-reflecting surface.

3. An imaging device according to claim 2, wherein said fiber optic light guide member has opposite ends having respective reflecting surfaces lying transversely across said joint face.

4. An imaging device according to claim 2, wherein said photoelectric transducer is optically connected to said joint face by a transparent adhesive.

5. An imaging device according to claim 1, wherein said fiber optic light guide member has wavelength converting means for converting the wavelength of the light applied to an entrance surface of the fiber optic light guide member, said entrance surface being coated with a layer for passing the light applied to the fiber optic light guide member therethrough and reflecting light whose wavelength has been converted by said wavelength converting means.

6. An imaging device according to claim 5, wherein said wavelength converting means comprises a light-emitting body having a function to convert the wavelength of the light applied thereto into a longer wavelength.

7. An imaging device according to claim 5, wherein said fiber optic light guide member has a joint face optically connected to said photoelectric transducer, and opposite ends having respective reflecting surfaces lying transversely across said joint face.

8. An imaging device according to claim 7, wherein said photoelectric transducer is optically connected to said joint face by a transparent adhesive.

9. An imaging device according to claim 1, wherein said fiber optic light guide member comprises an array of fiber optic plates each shaped as a rectangular parallelepiped.

10. An imaging device according to claim 1, wherein said fiber optic light guide member comprises an array of cylindrical fiber optic plates.

11. An imaging device according to claim 1, wherein said fiber optic light guide member comprises an array of semi-cylindrical fiber optic plates.

12. An imaging device according to claim 1, wherein said fiber optic light guide member comprises:
a flat strip optically connected to said photoelectric transducer by a transparent adhesive; and two arrays of fiber optic plates disposed one on each side of said flat strip and extending in said main direction, said fiber optic plates projecting from said flat strip by a predetermined length in said main direction.

13. The imaging device of claim 1, further comprising:
a receiving medium providing output emissions as a result of radiation applied by the stimulating radiation source;
wherein the photoelectric transducer receives the output emissions.

14. An imaging device according to claim 1, wherein the light guide member is directly mounted on said photoelectric transducer.

15. An imaging device according to claim 1, wherein said fiber optic light guide member comprises an array of fiber optic plates, and
wherein light incident upon the fiber optic plates originates from free space.

16. An imaging device for photoelectrically reading visual information, comprising:
a photoelectric transducer; and
a fiber optic light guide member comprising a plurality of fiber optic elements arrayed in a main direction in which pixels of said photoelectric transducer are also arrayed and having a length greater than the width of said pixels in an auxiliary direction which is substantially perpendicular to said main direction,
wherein said fiber optic light guide member has an entrance surface on one side to which light is applied and an opposite parallel surface on the other side from which the light exits, and wherein said entrance surface and said exit surface are parallel to the auxiliary direction of said length of said fiber optic light guide member; and
wherein said photoelectric transducer is mounted on the exit surface of said fiber optic light guide member.

17. An imaging device for photoelectrically reading visual information, comprising:
a photoelectric transducer;
a fiber optic light guide member comprising a plurality of fiber elements arrayed in a main direction in which pixels of said photoelectric transducer are also arrayed and having a length greater than the width of said pixels in an auxiliary direction which is substantially perpendicular to said main direction; and
a light condensing element disposed between said fiber optic light guide member and a recording medium,
wherein said fiber optic light guide member has an entrance surface on one side to which light is applied and an opposite parallel surface on the other side from which the light exits, and wherein said entrance surface and said exit surface are parallel to the auxiliary direction of said length of said fiber optic light guide member.

* * * * *

UNITED STATES PATENT AND TRADEMARK OFFICE
CERTIFICATE OF CORRECTION

PATENT NO.        : 7,045,796 B2                                              Page 1 of 1
APPLICATION NO. : 10/244509
DATED             : May 16, 2006
INVENTOR(S)       : Hiroyuki Karasawa

It is certified that error appears in the above-identified patent and that said Letters Patent is hereby corrected as shown below:

Please correct the assignee column on the front page as below:

(73)  Assignee:  [[Fuki]] Fuji Photo Film Co., Ltd.,

Signed and Sealed this

Twenty-first Day of November, 2006

JON W. DUDAS
*Director of the United States Patent and Trademark Office*